Dec. 20, 1938.  McG. CLINE  2,140,511
METHOD OF TREATING CRUDE OLEO-RESINS
Filed May 10, 1935  3 Sheets-Sheet 2
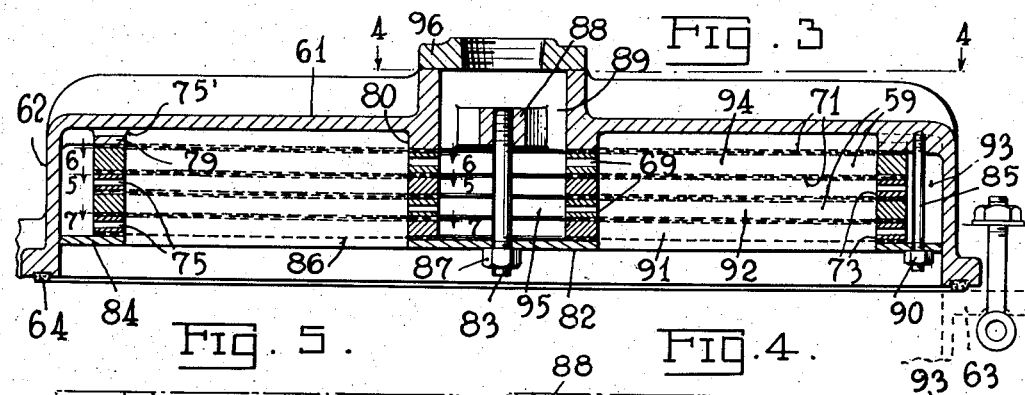
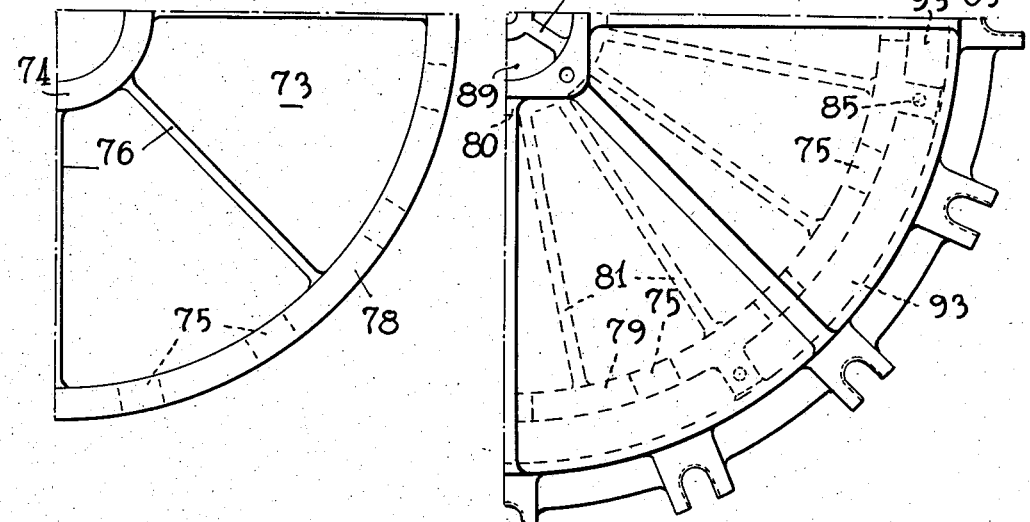
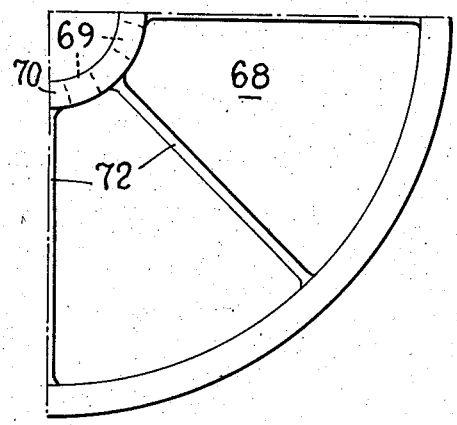
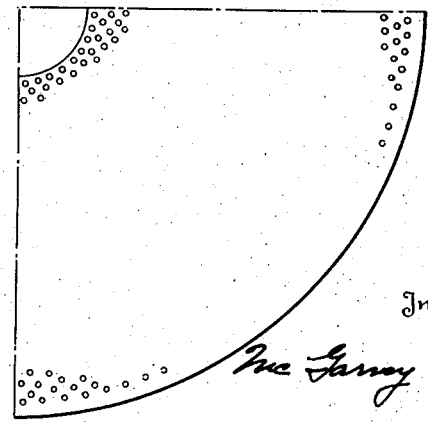
Inventor.
McGarvey Cline.
By Stone, Boyden & Mark
Attorneys.

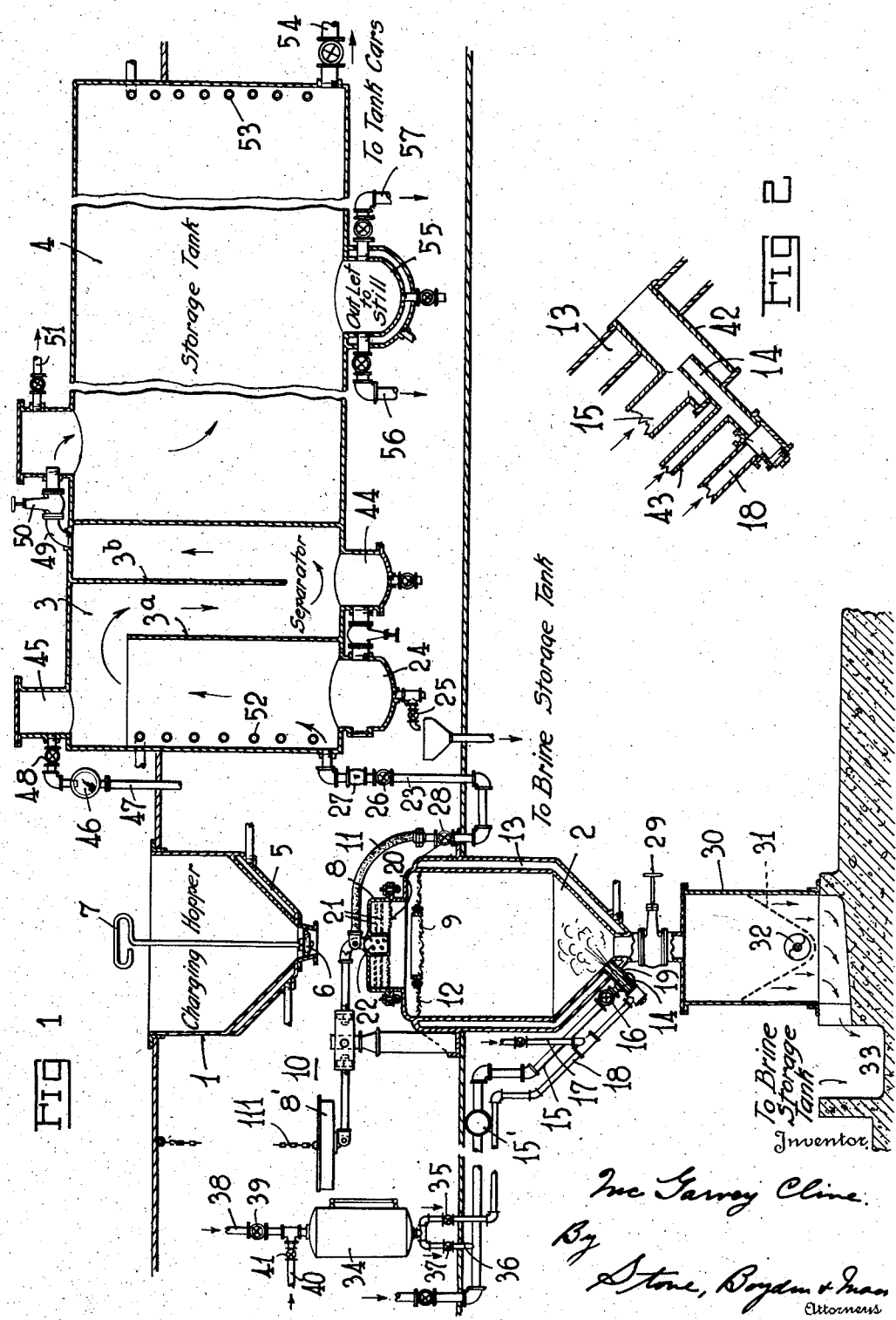

Dec. 20, 1938.   McG. CLINE   2,140,511
METHOD OF TREATING CRUDE OLEO-RESINS
Filed May 10, 1935   3 Sheets-Sheet 3

Inventor.
McGarvey Cline.
By Stone, Boyden & Mach
Attorney

Patented Dec. 20, 1938

2,140,511

UNITED STATES PATENT OFFICE 2,140,511

METHOD OF TREATING CRUDE OLEO-RESINS

McGarvey Cline, Jacksonville, Fla.

Application May 10, 1935, Serial No. 20,836

10 Claims. (Cl. 260—107)

This invention relates to apparatus for and methods of purifying crude pine oleo-resins and of separating desirable from undesirable portions thereof.

As is well known, crude pine oleo-resins constitute the basic raw material of the gum naval stores industry. They are obtained by the periodic scarification of pine trees and directing the oleo-resin, which exudes from the scar, into cups attached to the trees. The exudations are removed from the cups and collected in barrels, which are the containers ordinarily used for the transportation of the crude oleo-resin from the forest to the still. During the long period of exposure of the oleo-resin in flowing from the tree to the cups, and in the cups prior to its collection, the oleo-resin is subject to contamination of various kinds. Oxidation is the most important agency in modifying the materials from a chemical standpoint. Practically all of the constituents of oleo-resin are unsaturated compounds and combine with oxygen at ordinary atmospheric temperatures. Such combinations produce various acids, also gummy materials which are only slightly soluble in the original oleo-resinous materials even after they have been liquefied by the application of heat. These gummy substances coalesce around particles of dust with which the tacky material becomes contaminated during its period of exposure to the elements. The oleo-resin also becomes contaminated with chips, pine needles, bark, sand, and water containing traces of tannic acid, other organic acids, and various other organic water soluble materials. The amount of such contamination varies with the weather and other conditions of exposure.

The average barrel contains approximately 435 pounds of oleo-resin and contaminating materials. The general practice of the gum naval stores industry is to charge from eight to ten barrels of the crude as it is delivered from the forest into direct fire stills for separating the volatile constitutents (turpentine, water, and volatile acids) from the non-volatile constituents (rosin, contaminating chips, etc., and other non-volatile matter) of the crude material as delivered from the forest. After the volatile constituents have been removed, the melted rosin, heated to a temperature of approximately 320 degrees Fahrenheit, together with all of the extraneous trash and other non-volatile materials, is discharged from the still through strainers and cotton batting for making a substantial separation of the solid non-volatile materials from the liquid non-volatile materials (rosin, tannic acid and other non-volatile water soluble materials) contained in the original crude oleo-resin.

It has long been recognized by the industry that this method of treating the crude oleo-resins involves the following highly undesirable results:

1. A substantial loss of rosin due to its absorption and adhesion to the cotton batting and extraneous solid matter contained in the crude oleo-resin. (Chips, bark, pine needles, sand, etc.)
2. A lowering of the color grade of the rosin. (½ to 1½ grades).
3. The contamination of the rosins with finely divided trash which is not removed by the method of filtering through cotton batting.
4. The contamination of the rosins with varying amounts of non-volatile organic materials contained in the crude oleo-resin including the products of oxidation resulting from exposure. These products are largely responsible for the variable color of gum rosins.
5. The production of rosins showing maximum variability in color and in their chemical composition. (13 color grades and variable contamination with tannic acid and water soluble carbohydrates and other non-volatile water soluble materials contained in the crude oleo-resin.) Small batch treatment of the crude oleo-resins without bulk mixing before distillation is, of course, partially responsible for the variability in the rosins produced.

In present general practice there is obtained, for example, from a typical barrel of crude oleo-resin the following assortment of materials:

|  | Pounds |
|---|---|
| a. Rosin | 297 |
| b. Turpentine, 10.7 gallons | 77 |
| c. Chips, bark, needles, etc. | 21.5 |
| d. Sand and fine trash | 2.8 |
| e. Batting dross | 5.7 |
| f. Water and unaccounted for | 31.0 |
| Average total per barrel crude gum | 435.0 |

Items c, d, and e are completely saturated and covered with rosin which is lost, or, is sold at a large discount to extraction plants which reclaim rosin from batting dross and other still wastes. In crude oleo-resin of the composition indicated above, the rosin loss per barrel of crude, aggregates approximately 18 pounds. Even in crudes where great care is taken to prevent contamination with extraneous trash, the rosin loss approximates 10 pounds per barrel of crude oleo-resin distilled. In addition to this rosin loss, the rosins produced are contaminated with the non-volatile materials in solution with the water content of original crude oleo-resin as well as with fine trash not removed by imperfect methods of filtration. Poorly filtered rosins and variability in chemical composition constitute the most serious grounds for consumers' dissatisfaction with gum rosins.

It has been generally appreciated by the progressive thought of the industry that effective filtration, washing, and bulk mixing of crude oleo-resins prior to their distillation for conversion into rosin and turpentine would be of broad benefit to the industry. Various efforts have been made from time to time to develop processes and apparatus for accomplishing the desired ends. In the use of various types of filters that have been tried for instance, the exposure of the heated oleo-resins or of the extraneous matter saturated with them, results in serious loss of the highly volatile terpene constituents. On account of the high relative value of these constituents, no method which involves loss of them can be economically applied.

The chief difficulty in filtering oleo-resins has been due to the relatively insoluble gummy substances to which reference has been made. These materials, in conjunction with dust and finely divided trash to which they adhere, form impervious coatings over the filtering medium and thus prevent the passage of the liquefied oleo-resinous materials through the filtering medium. Another major difficulty has been that the extraneous trash contained in the crude oleo-resin, occurs in such quantities that it retains so much oleo-resinous material after the completion of the straining and filtering operation, that the general economy of the operation was affected by this retention. In the practice heretofore, losses have resulted from adherence of materials to this trash.

An object of the present invention is, therefore, to provide improved apparatus and a method of treatment which will economically accomplish the following results:

1. The technique of the method is such, that the colloidal and gummy materials adhering to the finely divided trash, are substantially prevented from reaching the filtering medium.

2. The liquid oleo-resinous material adhering to the chips, bark and other extraneous trash, is substantially removed from the trash before it is discharged from the system and exposed to the atmosphere.

3. Water soluble materials contained in the crude oleo-resins are substantially removed from it prior to its distillation into rosin and turpentine.

In the method of the present invention, untreated crude oleo-resins as obtained from living trees are thoroughly liquefied with the aid of heat, preferably while agitating. The resulting liquid materials are separated from the solid impurities of the crude oleo-resins. After the adhering oleo-resinous material has been substantially completely removed from the solids, the liquefied oleo-resin is separated from the aforesaid liquid materials to obtain a product having a low proportion of water soluble constituents or one in which the water soluble acid content is negligible from the practical standpoint.

The entire process is preferably carried out in vapor tight apparatus in which the various steps from the heating of the crude oleo-resin to the cooling of the final oleo-resin product are conducted without appreciable loss of volatile terpenes.

The general method according to this invention of accomplishing the separation of the oleo-resinous material from the contaminating gummy and colloidal substances, water soluble materials, and extraneous solid matter, is to synchronize an inverted displacement filtration operation, with a gravity sedimentation. The gummy substances coalesced around particles of dust are highly adhesive and of higher specific gravity than the liquefied oleo-resins and when the liquid is not subject to agitation, these materials settle slowly to the bottom. Agitation is prevented when filtering and a removal of clarified oleo-resinous materials secured at the top of the charge by forcing it upward through the floating extraneous solid matter and a filtering medium at the top of the container. This is accomplished by the controlled injection of a fluid displacement medium into the bottom of the container. The general requirements regarding the displacing fluid are, that it be of higher specific gravity than the liquid oleo-resin and non-miscible with it. A specific exception to the requirement regarding miscibility will be later discussed.

The rate of injecting the displacement fluid is preferably one which does not force the settling gummy materials through the floating extraneous solid materials so rapidly that they are deposited upon the filtering medium. Such controlled displacement is described as synchronizing displacement with sedimentation and adhesion of gummy materials. With such control, filtration can be accomplished in a minimum of time and with greater efficiency with respect to the use of the filtering medium. The most efficient rates of displacement for different classes of oleo-resin will be determined in the course of some little operating experience depending on the particular materials and equipment used. It is obvious, however, that sedimentation can be completed before the injection of the displacement medium is started.

Water is the most available displacement medium. Its use is also advantageous because it serves as a selective solvent for highly ionized organic acids contained in the oleo-resin, and also as a solvent for various non-volatile materials which contaminate the crude oleo-resin. Hot liquid oleo-resin and water at the same temperature are of approximately the same specific gravity. The desired difference in the specific gravity of the two liquids may be obtained, either by lowering the specific gravity of the oleo-resin by thinning it with turpentine or other low gravity solvent for it, or by increasing the specific gravity of the water by means of salt or other high gravity material soluble in water. Lowering the specific gravity of the oleo-resin by the addition of turpentine has advantages which lead to the selection of this method in certain specific cases.

Brine is the most generally preferred displacing medium in the present process. It is used with a high degree of efficiency and is remarkably effective and outstanding in the displacement of oleo-resins from solid impurities found in the crude material. It is highly effective in the treatment of crude oleo-resins from any source including, for instance, trees of the order Pinales and more particularly the species of pines known as *Pinus palustris* and *Pinus caribaea*, which are the most common varieties of Southern yellow pine.

A preferred type of apparatus in which the present method may be conducted, is shown in the accompanying drawings in which:

Fig. 1 is a vertical sectional view partly in elevation of the apparatus;

Fig. 2 is a cross sectional view of a modified portion of the apparatus shown in Fig. 1;

Fig. 3 is a vertical central sectional view of a filter head employed on a treating vessel shown in Fig. 1;

Figure 8:
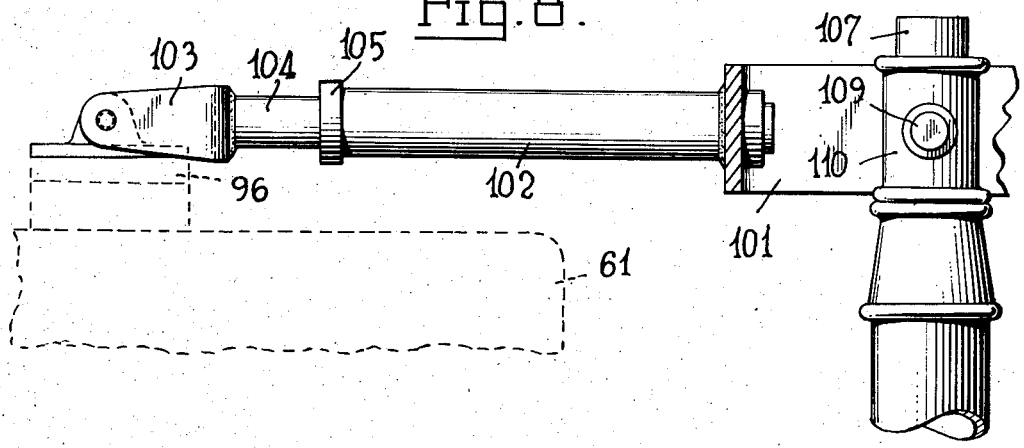
Figure 9:
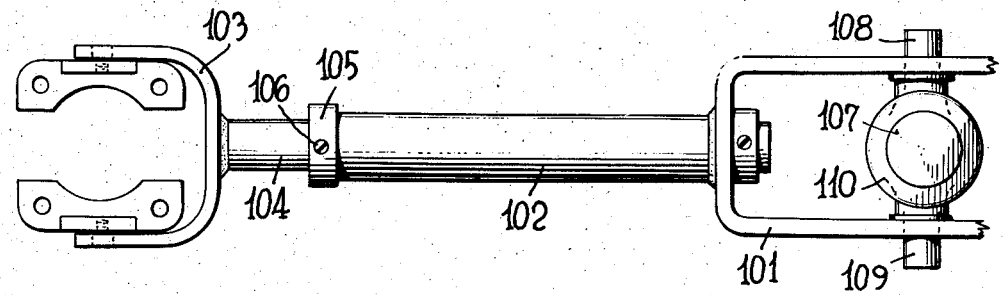

Figs. 4, 5, 6 and 7 are fragmentary views of portions of the filter head, taken on lines 4—4, 5—5, 6—6 and 7—7 in Fig. 3 in the direction of the arrows; and Figs. 8 and 9 are side elevational and plan views respectively of a portion of a device for lifting the filter-head on and off the treating vessel.

The following detailed description of the apparatus and its operation will serve to illustrate the invention. The construction of the apparatus will be readily understood from a description of a typical plant run for treating the crude oleo-resin.

The apparatus shown comprises a hopper 1, a melter 2, a separator 3 and a storage tank 4. The crude oleo-resin is dumped into the hopper 1 which may be provided with a steam jacket 5 on its conical bottom for heating the charge to approximately 180° F. but preferably only sufficiently to make the charge flow freely when the dumping valve 6 is lifted from its seat in the charging operation. If desired, the oleo-resin may be liquefied before charging it into the melter. The valve 6 is opened simply by pulling upwardly on the handle 7.

The melter 2 is beneath the hopper 1 so that material from the latter may fall directly into the melter. The melter 2 is provided with a removable filter head 8 of any desired construction, an extra filter head 8', and a removable screen 9. To charge the melter 2, the filter head 8 is removed conveniently by means of a mechanism designated generally by the numeral 10. The details of a highly efficient filter head and mechanism for removing the same will be described below in connection with Figures 3 to 9 inclusive. A flexible pipe 11 connected to the filter head 8 is readily disconnected when the latter is about to be lifted and swung off. The removable screen 9 extends across a central opening in and is supported and held in position by a fixed screen 12 that is horizontally positioned in the upper portion of the melter a short distance below the charging hole thereof.

The charging hopper 1 and the melter 2 are so proportioned that one hopperful of the material to be charged will fill the melter to a level somewhat lower than the level of the fixed screen 12. After the charge has been introduced into the melter, the screen 9, filter head 8, and flexible pipe 11 are assembled as shown in the drawing. When thus assembled the melter is pressure tight.

Heat is then applied to the crude oleo-resin either directly or indirectly or both. Direct heating is preferred and indirect heating is dispensed with if desired. The melter 2 may be provided with a steam jacket 13 for indirect heating, and a jet 14 for injecting a heated fluid such as steam, superheated or saturated if desired, into the charge. Saturated steam is generally preferred. In heating a charge, some indirect heat may be applied while a major supply of heat is derived from pressure steam injected into the melter. The steam thus injected effectively agitates and mixes with the charge, and rapidly melts the oleo-resin while condensing in the melter and delivering its latent heat. The live steam serves also as a means for uniformly dispersing the various materials, employed in treating the oleo-resins, throughout the bulk of material being processed as will be described below. The injection of steam is continued until a temperature is reached above the melting point of constituents of oleo-resins. Steam may be introduced until a slight pressure at the head of the melter indicates that the charge has been heated to a temperature at which the steam no longer condenses, which temperature may be approximately 200° to 212° F. The crude oleo-resins may be thoroughly liquefied by heating them to approximately 180° F. or higher.

After the oleo-resin has been liquefied, brine or other displacement medium supplied by a pressure pump, is injected into the melter 2 at a controlled rate of flow through a pipe 15 provided with a valve 16. The means for injecting brine and steam separately or together may be constructed as shown. A steam pipe 17 is shown connected to a pipe 18 which in turn is connected to the jet 14 extending into a concentrically arranged tubular connection 19 opening into the bottom of the melter 2. The brine pipe 15 is connected to the side of the tubular connection 19.

The brine or other non-miscible liquid is preferably maintained at a specific gravity of approximately 1.15 or more. The melted oleo-resin having a specific gravity of approximately 0.96, floats on the injected brine. At the time the injection of the brine is commenced, the condition of the charge of liquefied oleo-resin is generally as follows: It is free from agitation; the water in the original crude oleo-resin, together with the water added by condensation of steam injected for melting and agitation, and water that may optionally have been added for washing, are mixed with the oleo-resinous material in the form of a moderately unstable emulsion. The bark, pine needles, chips, and other extraneous trash of lower specific gravity than the liquid contents, are floating in the charge immediately under screens 9 and 12. Fine sand and other trash with adhering gummy materials of higher specific gravity than the liquid, together with some chips, are settling or have settled to the bottom of the melter.

As the injection of brine continues, the clarified liquids of lower specific gravity are forced upwardly through relatively coarse screens 9 and 12 and then through a finer screen 20 and finally through filter plates 21, into the central outlet 22, from which the liquids pass successively through the flexible connection 11, the pipe 23, and into the separator 3.

At this point the two general methods of injecting the displacement medium will be more fully discussed. The aggregate mixture of non-miscible liquids, solid materials, and insoluble gummy and colloidal substances are all characterized by differences in their specific gravities. There is less difference in the specific gravity of the aqueous solutions and liquod oleo-resinous matter, than there is between the specific gravity of the gummy materials (coalesced around particles of trash) and liquid constituents. The gummy substances, therefore, settle more rapidly from the mixture of liquids than the liquids separate from each other. If the sedimentation is completed before the injection of the displacement fluid is started, the continuous separator may be dispensed with and the oleo-resinous material transferred direct from the melter to the storage tank or still. In order to save time, however, and increase the capacity of the melting and filtering equipment, the injection of the displacement fluid is synchronized with the rate with which the gummy and colloidal substances settle from the mixture of liquids. This method of injection results in forcing both the aqueous and oleo-resinous liquids through the filtering medium but prevents the deposit of the gummy materials on the filtering medium. With synchronized displacement the continuous separator is provided to accomplish the more gradual separation of the aqueous and oleo-resinous liquids. The separation of the liquid constituents may be accelerated either by the injection of brine during the agitated melting operation so as to increase the specific gravity of the aqueous liquids, or by the injection of turpentine during the agitated melting operation so as to decrease the specific gravity of the oleo-resinous liquid, or by a combination of these means. It is obvious that such means of controlling the relative specific gravity of the component parts of the mixture of materials is one of the distinctive advantages of this process. This advantage is especially associated with this use of a steam jet for melting, agitating, and mixing simultaneously carried on by a single and simple medium.

Although the use of brine is mentioned as one means of displacing the liquefied oleo-resin, water itself may be employed as a displacing medium upon reducing the specific gravity of the oleo-resin. To accomplish this, a thinning agent of lower specific gravity than water, as for instance turpentine, may be mixed with the oleo-resin. If an amount of turpentine equal to approximately 10% of the weight of the oleo-resin being processed, is introduced in the general manner described for the introduction of other materials, fresh water can be used as the displacing medium instead of brine. The thinning of the oleo-resin with turpentine greatly facilitates the filtration of the material. Since turpentine has a low heat of vaporization, it is relatively inexpensive to recover it. Some thinning and the use of a weak brine solution may also be adopted.

The description of the process has thus far been confined to the treatment of crude oleo-resin in charges or batches determined by the size of the container. By liquefying the crude oleo-resin in a separate container by heating to a temperature lower than the temperature of the oleo-resinous material undergoing sedimentation and displacement filtration, they may be used as a displacement medium in the first stages of the filtering cycle. The specific gravity of liquefied oleo-resins varies inversely with temperature. The specific gravity of the liquefied oleo-resins injected as a displacement medium is, therefore, higher than the specific gravity of the higher temperature material being forced through the filtering medium as the gummy and colloidal substances settle toward the bottom of the container. The indirect heat supplied by the steam jacket gradually raises the temperature of the injected oleo-resins as they rise slowly toward the filtering medium in counter flow to the descending gummy and colloidal substances and other high gravity constituents. Thus liquefied oleo-resins may be used as a displacement media until sufficient gummy and other extraneous materials have been accumulated in the filtering vessel. After such accumulation, the use of liquefied oleo-resin as a displacement medium is discontinued, and a non-miscible displacement medium is used to complete the filtration of the batch and accomplish the removal of oleo-resinous material from the accumulated extraneous solid materials.

The apparatus and method of using an aqueous displacement medium affords wide latitude in the methods of treating the extraneous materials accumulated as a residue from the filtering operation prior to their exposure to the atmosphere. By submerging these materials in hot brine of high specific gravity an efficient removal of liquefied oleo-resinous materials may be obtained. By withdrawing brine or other aqueous displacement medium together with the sand and other materials of higher specific gravity than the displacement medium, the floating trash may be retained in the container by not withdrawing all of the aqueous displacement medium. Turpentine or other solvent non-miscible with the aqueous medium can then be injected so that it floats on the aqueous medium and surrounds the extraneous solid matter floating on the aqueous medium. After the injected solvent has dissolved all of the gummy materials soluble in it, a renewed injection of the aqueous medium forces this solution upward through the screens and filtering medium and by holding the solid chips, etc., submerged in the hot aqueous medium all of the solvent adhering to the solid material may be recovered and forced through the filtering medium. In this operation, of course, the solvent is directed to a container provided for it instead of the container provided for the filtered oleo-resin. This solvent treatment of the solid matter may be used when it is desired to recover the gummy residues of filtration which are not readily soluble in the liquefied oleo-resins. Generally speaking, these gummy materials produce so-called low grade rosins of relatively low acid number. Only with high priced rosin markets would their recovery be commercially warranted.

Any pressure may be provided in pumping the brine into the melter to force the liquids through the filter plates 21. It has been found that filter pressures of approximately forty pounds per square inch secure a satisfactory rate of flow. The rate injection of brine may be indicated by a meter 15' or continued until a test valve (not shown) at the outlet of the filter head 8 indicates that brine has reached the outlet and has completely displaced the original liquid contents of the melter.

At this stage of the operation all of the extraneous trash contained in the original crude oleo-resin is held submerged in the hot brine of high specific gravity. The fluid oleo-resinous matter adhering to the trash floats to the top and collects under the filter plates, and, as the injection of brine is slowly continued, is forced through the filter plates and is carried along with some brine into the separator 15. The introduction of hot brine is continued until the oleo-resinous material adhering to the trash and filter plates has been effectively removed. The brine used in washing the trash may enter the separator 15, and settles quickly into the brine sump 24, from which it is drained through the valve 25 and returned to the brine storage tank for reuse or may be diverted to a separate container. At the end of the operation, an important practical consideration is, that the connecting pipes 11 and 23 are left filled with brine thus preventing them from becoming filled with chilled oleo-resin during periods of time when they are not in use. The pipe line 23 is provided with check valve 26, so that liquid can not flow from the separator back to the melter; and also with suitable cut off valves 27 and 28.

It is important to note the relative positions of materials in the melter when the filtering operation is about to commence. The crude oleo-resin introduced into the melter contains oxidized oleo-resinous materials which are not readily soluble in the liquefied oleo-resins, but which have a higher specific gravity than the liquid materials. These materials settle in the oleo-resin, but float on the surface of the brine. When the processed liquefied oleo-resinous materials have been displaced by the brine, to the point where the level of the brine has reached the screen that retains the floating chips, the heavy gummy materials which are floating on the brine adhere to the material being retained by the screen and are thus prevented from reaching the filter cloths and from passing into the separator where the filtered oleo-resin is collected. This protection of filter cloths from the gummy substances is a very important practical consideration.

Liquid oleo-resinous matter adhering to the floating trash, after the trash has been submerged in the brine, floats to the top of the melter due to its specific gravity being lower than the specific gravity of the brine. It is not necessary to circulate brine at all while this gravity separation is taking place. In fact, the brine pump at this stage of the operation may be stopped, for instance, for approximately 10 minutes. This is sufficient time to accomplish the separation of the liquid oleo-resinous matter from the chips kept submerged in the brine by the screen. More brine is then injected to displace the oleo-resinous material separated from the chips, and to wash the filter cloths, and displace the oleo-resinous material from the pipe lines connecting the melter to the separator. Provision is made for withdrawing brine from the separator, merely because in practice the exact displacement of the oleo-resin by the brine may not be accurately controlled.

When the filtering and washing operation has been completed, the melter discharge valve 29, and the testing valve in the filter head mentioned above (not shown in drawings) are opened, the hot brine flows rapidly from the melter carrying with it the chips and other trash. The outflow of brine partially cleans the filter plates and screens by drawing air through them in reverse direction to the flow of the liquids. The brine and washed trash are discharged into the chip strainer 30, which is provided with a perforated metal bottom 31, and a conveyor element 32. The brine drained from the chips is returned to the brine storage tank (not shown in the drawings) through the flume 33, which is provided with suitable baffles for separating sand and fine trash which may have passed through the chip screen 31. The drained chips are removed by the conveyor element 32. After dumping the brine and trash the melter is recharged and the operating cycle repeated.

For special treatment of oleo-resinous material in the melter 2, an auxiliary measuring tank 34 is employed and is connected at its bottom to the pipe 18 provided with a valve 35, and to the pipe 15 by means of a pipe 36 provided with a valve 37. By means of a sight glass gauge on the tank 34, measured amounts of water, or other liquids may be introduced into the melter 2 with or without steam. Turpentine for thinning the oleo-resins, or washing water, for instance, may be thoroughly mixed with oleo-resin in the melter. If desired, the treating liquids may be forced in under pressure either through the pipe 18 or through pipes 36 and 15. A pipe 38 provided with a valve 39 and connected to the top of the tank 34 may serve for introduction of treating liquids. A pipe 40 provided with a valve 41 and connected to the pipe 38 serves to introduce air or pressure steam for placing the contents of the tank 34 under pressure. If desired, liquids for displacement purposes, as for instance liquefied oleo-resins mentioned above, may be passed to the melter by way of the tank 34 and pipes 36 or 18.

As set forth in my copending application Serial No. 34,623 filed August 3, 1935, oleo-resinous material may be treated to modify the oleo-resin. Alkaline solutions may be introduced preferably before the brine is introduced to remove the liquefied oleo-resin from the melter. Aqueous solutions of hydroxides or carbonates of alkali metals or hydroxides of alkaline earth or ammonia may be employed. Enough solution may be introduced to substantially neutralize the water soluble or highly ionized corrosive acids of oleo-resin, or an excess may be introduced to not only neutralize such acids but react to form resinates. By introduction with steam or under pressure, a thorough dispersion of material is obtained.

In Fig. 2, means are shown whereby alkaline solutions may be injected separately. The tubular connection 42 may be substituted for the pipe 19 shown in Fig. 1 passing through the steam jacket 13 and opening into the melter 2. The brine pipe 15 is connected to the tubular member 42. Both the pipe 18 for steam and a separate pipe 43 for alkaline solutions are connected to the injector pipe 14. The pipe 43 is connected to the injector 14 between its open end and the steam pipe 18.

Reference is now made to the separator 3, the functions and operation of which will here be described. The capacity of the separator 3 is proportioned to the capacity of the treating operations so that the material passing through is retained in the separator for a desired minimum period of time. The flow of liquids through the separator is indicated by the arrows. For this purpose baffles 3ª and 3ᵇ may be provided as shown, the former extending part of the way up from the bottom around the sump 24 and the latter extending part of the way down from the top above the sump 44. Except when emptied for cleaning or other reason, the separator is always filled with the oleo-resins being processed. Materials having a specific gravity higher than the liquid oleo-resins are removed, principally through the brine sump 24, and secondarily at intervals, through the cleaning sump 44. Such materials are the washing brine used in cleaning the chips and finely divided solid matter which may have passed through the filter heads. Liquids and other substances of lower specific gravity than the liquid oleo-resin are removed through the outlet 45, which discharges through sight glass 46 and pipe line 47; the rate of discharge being controlled by means of valve 48. Such materials are washing water containing the water soluble components of the crude oleo-resin, as well as other water soluble materials resulting from chemical treatments of the oleo-resin.

The bulk of the aqueous solution collects at the top of the separator and is withdrawn through the outlet 45. The oleo-resinous material flows from the separator 3 into the storage tank 4 through the outlet 49 provided with a valve 50. The storage tank 4 is provided with a regulated vent 51 which permits of the operation of both the separator and tank under pressures for example slightly greater than atmospheric pressures. This vent line is provided with suitable check valves to admit air as material is drawn from the tanks, but to direct the vapors and air vented from the tank through a condenser (not shown) for the recovery of the vapors. The air from the condenser should in this case be led through a water seal. Both the separator 3 and storage tank 4 are equipped with heating coils 52 and 53 for regulating the temperature of their contents, to maintain the contents in a thin liquid condition so that gravity separation may be accelerated. The storage tank is preferably elevated for gravity discharge into tank cars through outlet 54, or, into stills through a steam jacketed sump 55, and heated pipe lines 56 and 57 for conversion into rosin and turpentine, paper size, or other commodity.

It is seen in the operation of the above described apparatus that convenient and efficient separation of solid impurities and of filtrates of different specific gravities may be obtained. A conversion process, by chemical means or selective solutions of different specific gravity, is combined with a selective displacement filtration process. The displacement filtration process makes it possible for filter plates to be placed above the material to be filtered so that plates are not contaminated by the gummy matter which settles out of the liquid oleo-resins being processed. This is of considerable importance in the filtration of the pine oleo-resins, both from the operating standpoint as well as from the standpoint of separating the gummy coloring materials from the oleo-resin. Heretofore distillation of oleo-resins without filtration, washing, or preliminary processing, resulted in production of gum rosins containing impurities which the process of the present invention removes.

One type of filter head that is particularly suitable for use on the melter 2 comprises a plurality of filter plates 59 assembled as shown in Figure 3 and mounted in spaced relation beneath the cover 61 provided with a downwardly extending flange 62, the edge of which seats on the flange 63 at the mouth of the melter. A gasket 64 may be provided to prevent leakage of vapors. The cover 61 is adapted to be clamped on the melter 2 by any desired means.

A filter plate consists of a spider 68 (Figure 6) upon each side of which a perforated plate or screen (Figure 7) is attached so that the spider and two perforated plates comprise a rigid unit with open spaces between the circular perforated surfaces, which open spaces have outlets 69 in the hub ring 70. Filter cloth 71 is placed so that it completely covers the surfaces of each filter plate. The radial elements or spokes 72 serve as supports for the perforated plates against the pressures employed to force the filtrate through the filter cloths superimposed on the perforated plates. They also serve to give rigidity to the assembled filter plate.

Spiders 73 (Figure 5) are used to space the filter plates from each other. Spiders 73 have solid hub rings 74 but have ports 75 in their outer rings preferably equally spaced on the circumference. In these spiders, the radial elements 76 serve only to hold the rings 74 and 78 together so that they can be readily handled and assembled.

The inside horizontal surface of the cover 61 (Figure 3) is provided with downwardly projecting flanges which make up one of the spiders with radial ports 75' in the outer ring 79, a solid hub ring 80 and radially extending spokes 81. This construction is shown by the dotted lines in Figure 4.

The filter head is assembled so that each filter plate 59, with its circular surfaces covered with filter cloth, lies between two of the spacing spiders 73. This assembly is clamped together and to the head by means of the central clamp plate 82, a stud bolt 83, a clamp ring 84 and stud bolts 85. When so clamped together the layers of filter-cloth form gaskets between the various hub rings and outer rings so that no leakage of material can pass between the surfaces of these rings. A circular screen 86 may be placed between the clamp plates 82 and 84, and the first spacing spider 73. The central clamping stud bolt 83 provided with nut 87 at its lower end, is securely screwed into spider 88 in the opening 89 of the cover 61 so that only the nut 87 is readily removable. The circumferentially arranged stud bolts 85 are screwed securely into bosses in the filter head so that only the nuts 90 holding the clamp ring 84 are readily removable. The stud bolts 85 serve to center the spiders and filter-plates so that they can be quickly and accurately assembled, and it is obvious that when the clamping nuts are removed the assembly can be quickly dismantled for cleaning and changing filter cloths.

The passage of liquid through the filter may be briefly described as follows: Liquid to be filtered passes upward through the screen 86 into the space 91. Some of the liquid passes through the filter cloth on the bottom side of the first filter plate into the space 92, while other unfiltered liquid flows through the radial ports 75 in the lowest member 73 into the annular space 93 between the outer ring elements and the flange 62. From this annular space the unfiltered liquid flows through the ports 75 in the second member 73 and also through ports 75' in the member 79 cast as an integral part of the cover 61; thence it passes through the filter cloths into spaces 92 and 94 which are the interior spaces of the filter plates. From these spaces it flows through the radial ports 69 in the hub rings of the filter plates into the central cylindrical space 95. All liquid must pass through filter cloth into spaces 92 and 94 before it can enter the central passage 95 through the ports 69. The opening 89 in the cover 61 is provided with a coupling element 96 to which pipe 11 (Figure 1) is connected. The filtered liquid passes through the opening 89 into pipe 11 as described above.

It is obvious that the filter head can be constructed for the assembly of as many filter plates as may be required to furnish the desired area of filtering surface. Furthermore, it is possible to provide an arrangement of parts in the filter head whereby the unfiltered liquid in the melter will pass into the central passage 95 and the filtered liquid will be directed into the annular space 93 and then out.

Referring to Figures 8 and 9, one half of a rigid lever member is shown composed of yoke 101 with a rigid hollow cylindrical extension 102, holding a yoke 103 rigidly attached to a cylindrical arm 104. The cylindrical element 104 passes through the element 102 and may be rotated within the element 102. The set collar 105 slides on 104 but when clamped by set screws 106, this collar fixes the position of arm 104 and yoke 103 with reference to a center of rotation or axis 107, but permits the rotation of the yoke 103 on the axis of its extension member 104. The lever element as a whole is pivoted for vertical movement on pins 108 and 109 passing through yoke 101 and into a sleeve 110 mounted for rotation on the vertical axis or rigid post 107. The completely assembled lever element is shown in Figure 1, attached to the filter head 8 in operating position on the melter 2 and to an extra filter head 8' which has been rotated into position for cleaning and fitting with fresh filter cloths. Both portions of the lever element on either side of the axis 107 are symmetrical. The two filter heads 8 and 8' counterbalance each other when they are being removed from the melter or being placed in position on the melter, thus making it easy for a single operator to handle the heads while they are being attached or detached from the melter. A chain 111 prevents the rotation of the filter head 8' about the arm 104 while it is being cleaned and reassembled. The filter head 8 attached to the melter prevents all other movement of the lever element and extra filter head.

In the filtration of oleo-resinous material, one way of synchronizing the rate of injection of a displacement fluid into the melter 2 with the rate of settling of gummy and colloidal substances in the melter, as set forth above, may be here described as follows: The capacity of the melter in gallons or cubic feet being known, brine or other displacement medium is passed through a meter 15' in the pipe 15 at a constant pressure. At such pressure, any abnormal deposit of gummy materials on the filtering medium is indicated by abnormal changes in the rate of injecting brine. Any abnormal changes in the rate of injection indicate that filtration is pushed too rapidly and is not synchronized. When this is observed, filtration may be stopped for a time or the rate of injection may be decreased thereby checking the deposit of gummy materials on the filtering medium. The reading on the meter will of course indicate the amount of displacement fluid introduced, and the amount of liquid forced through the filtering zone which is the equivalent of indicating the extent of the filtration. Such information aids in the control of the operation. Experience will, of course, teach the operator what is normal and what is abnormal with regard to injection rates.

It has been found that the apparatus is economical to install and gives a minimum of operating difficulties. The steam injected for melting is highly satisfactory as an agitating medium and also as a medium for obtaining uniform dispersion of processing materials in the crude oleo-resin constituting the batch being processed. The provision of the particular filtering means for the melter is another feature of the present invention that renders the apparatus highly efficient and economical.

Claims to apparatus features disclosed herein are presented in application Serial No. 230,745, filed September 19, 1938.

I claim:

1. A method of treating crude oleo-resins as obtained from living trees and prior to converting such oleo-resins into rosin and turpentine, the said oleo-resins containing water-soluble constituents and suspended solids, which method comprises contacting steam and crude oleo-resin to melt the oleo-resin and injecting solvent and steam simultaneously into the mass containing melted oleo-resin and solid impurities and thoroughly agitating the same, filtering the liquid portion of the mass, and separating oleo-resin from said liquid portion.

2. A method of treating crude oleo-resin as obtained from living pine trees and prior to converting such oleo-resin into rosin and turpentine, the said oleo-resin containing water-soluble constituents, and suspended substances including gummy and colloidal materials, which method comprises heating the said oleo-resin in the presence of water to liquefy the oleo-resin and to dissolve water-soluble constituents contained therein, permitting the high gravity solids and gummy substances to settle in the liquefied mass, introducing a non-miscible displacement liquid of higher specific gravity than the liquefied oleo-resins to displace the latter from the said liquefied mass, the settling of solids and gummy substances being synchronized with the displacement of liquefied oleo-resins while forcing the liquefied oleo-resins through a filter permitting the filtered liquid to settle, and separating an oleo-resinous product from the filtered liquid to obtain oleo-resin from which gummy and colloidal materials and water soluble substances have been separated.

3. A method of treating crude oleo-resin as obtained from living pine trees and prior to converting such oleo-resin into rosin and turpentine, the said oleo-resin containing suspended material including gummy and colloidal substances which method comprises introducing steam in jet form into a mass of the said crude oleo-resin to melt the oleo-resins while agitating the mass, introducing salt water while melting the oleo-resins and agitating the mass, to increase the specific gravity of the contents of the resulting charge and to accelerate coagulation of gummy substances and sedimentation of solids including said gummy substances, permitting said substances to settle, introducing additional brine to displace melted oleo-resins at a rate synchronized with the rate of settling of solids including gummy and colloidal substances, thereby forcing the oleo-resins through a filter and separating oleo-resins from the filtrates.

4. A method of treating crude oleo-resin as obtained from living pine trees and prior to converting such oleo-resin into rosin and turpentine, the said oleo-resin containing suspended material including the gummy and colloidal substances which method comprises introducing steam in jet form into a mass of the said crude oleo-resin to melt the oleo-resins while agitating the mass, introducing turpentine while agitating the mass to thin the oleo-resins, permitting solids in the mass to settle, introducing brine to displace melted oleo-resins at a rate synchronized with the rate of settling of suspended matter including gummy and colloidal substances and thereby forcing the oleo-resins through a filter and separating oleo-resins from the filtrates.

5. A method of treating crude oleo-resin as obtained from living pine trees and prior to converting such oleo-resin into rosin and turpentine, which method comprises injecting steam into a mass of the said crude oleo-resin to liquefy the oleo-resins, displacing the liquefied oleo-resin with liquefied oleo-resin of lower temperature and higher specific gravity than the oleo-resin to be displaced, and displacing the resulting mass with a liquid medium of higher specific gravity than the oleo-resins while forcing oleo-resin material upwardly through a filter to thereby obtain an oleo-resin product from which suspended solid material has been substantially removed.

6. In a process of treating crude oleo-resin aggregates to separate undesirable substances therefrom including gummy material and colloidal solids insoluble in the aggregate when liquefied, the said oleo-resin aggregate being obtained from trees and containing the pine tree exudates including such undesirable substances, the steps comprising liquefying within a container the said aggregate containing the said undesirable substances, introducing a body of a displacement liquid capable of forming a layer distinct from the liquefied oleo-resin aggregate and unreactive with the aggregate, and displacing the liquefied material without substantial agitation on said body of unreactive displacement liquid while forcing the liquefied oleo-resins through a filter to thereby obtain oleo-resin from which substances including gummy and colloidal materials have been separated, the presence of the displacement liquid permitting the higher gravity undesirable material including gummy material, colloidal, semi-colloidal and finely divided solids to settle away from the filter while permitting the liquefied oleo-resins to pass through the filter.

7. In a process of treating crude oleo-resin aggregates to separate undesirable substances therefrom including gummy material and colloidal solids insoluble in the aggregate when liquefied, the said oleo-resin aggregate being obtained from trees and containing the pine tree exudates including such undesirable substances, the steps comprising injecting steam into a charge of the said aggregate in a closed container, thereby liquefying the oleo-resins in the charge but preventing distillation of volatile constituents of the said oleo-resinous material, introducing a body of non-miscible displacement liquid of higher specific gravity than the liquefied oleo-resin aggregate and unreactive with the aggregate, and displacing the liquefied material without substantial agitation on said body of nonmiscible displacement liquid while forcing the liquefied oleo-resins through a filter to thereby obtain oleo-resin from which substances including gummy and colloidal materials have been separated, the presence of the displacement liquid permitting the higher gravity undesirable material including gummy material, colloidal, semi-colloidal and finely divided solids to settle away from the filter while permitting the liquefied oleo-resins to pass through the filter.

8. In a process of treating crude oleo-resin aggregates to separate undesirable substances therefrom including water-soluble constituents, and gummy material and colloidal solids insoluble in the aggregate when liquefied, the said oleo-resin aggregate being obtained from trees and containing the pine tree exudates including such undesirable substances, the steps comprising heating within a container the said aggregate containing the said undesirable substances in contact with water, thereby liquefying the oleo-resins in the aggregate and dissolving the said water-soluble constituents in the said water, introducing a body of non-miscible displacement liquid of higher specific gravity than the liquefied oleo-resin aggregate and unreactive with the aggregate, and displacing the liquefied material without substantial agitation on said body of non-miscible displacement liquid while forcing the liquefied oleo-resins through a filter to thereby obtain oleo-resin from which substances including gummy and colloidal materials, and water-soluble constituents have been separated, the presence of the displacement liquid permitting the higher gravity undesirable material including gummy material, colloidal, semi-colloidal and finely divided solids to settle away from the filter while permitting the liquefied oleo-resins to pass through the filter.

9. In a process of treating crude oleo-resin aggregates to separate undesirable substances therefrom including water-soluble constituents, and gummy material and colloidal solids insoluble in the aggregate when liquefied, the said oleo-resin aggregate being obtained from trees and containing the pine tree exudates including such undesirable substances, the steps comprising heating within a container the said aggregate containing the said undesirable substances in contact with water and a solvent for oleo-resins, thereby liquefying and thinning the oleo-resins in the aggregate and dissolving the said water-soluble constituents in the said water, introducing a body of non-miscible displacement liquid of higher specific gravity than the liquefied oleo-resin aggregate and unreactive with the aggregate, and displacing the liquefied material without substantial agitation on said body of non-miscible displacement liquid while forcing the liquefied oleo-resins through a filter to thereby obtain oleo-resin from which substances including gummy and colloidal materials, and water-soluble constituents have been separated, the presence of the displacement liquid permitting the higher gravity undesirable material including gummy material, colloidal, semi-colloidal and finely divided solids to settle away from the filter while permitting the liquefied oleo-resins to pass through the filter.

10. In a process of treating crude oleo-resin aggregates to separate undesirable substances therefrom including gummy material and colloidal solids insoluble in the aggregate when liquefied, the said oleo-resin aggregate being obtained from trees and containing the pine tree exudates including such undesirable substances, the steps comprising liquefying within a container the said aggregate containing the said undesirable substances, introducing a body of a displacement liquid capable of forming a layer distinct from the liquefied oleo-resin aggregate and unreactive with the aggregate, and displacing the liquefied material without substantial agitation on said body of unreactive displacement liquid while forcing the liquefied oleo-resins through a filter to thereby obtain oleo-resin from which substances including gummy and colloidal materials have been separated, discontinuing the introduction of the said displacement liquid to permit further separation of solids by settling, and then continuing the introduction of the displacement liquid to force further quantities of the liquefied oleo-resins through the said filter, the presence of the displacement liquid permitting the higher gravity undesirable material including gummy material, colloidal, semi-colloidal and finely divided solids to settle away from the filter while permitting the liquefied oleo-resins to pass through the filter.

McGARVEY CLINE.

CERTIFICATE OF CORRECTION.

Patent No. 2,140,511. December 20, 1938.

McGARVEY CLINE.

It is hereby certified that error appears in the printed specification of the above numbered patent requiring correction as follows: Page 5, second column, line 26, after "earth" insert the word metals; and that the said Letters Patent should be read with this correction therein that the same may conform to the record of the case in the Patent Office.

Signed and sealed this 6th day of June, A. D. 1939.

Henry Van Arsdale
Acting Commissioner of Patents.

(Seal)